United States Patent
Paul

(10) Patent No.: US 7,251,269 B2
(45) Date of Patent: Jul. 31, 2007

(54) APPARATUS AND METHOD FOR FINE SYNCHRONIZATION WHEN SAMPLING SPREAD-CODED RECEIVED SIGNALS

(75) Inventor: Steffen Paul, Baierbrunn (DE)

(73) Assignee: Infineon Technologies AG, Munich (DE)

( * ) Notice: Subject to any disclaimer, the term of this patent is extended or adjusted under 35 U.S.C. 154(b) by 250 days.

(21) Appl. No.: 10/487,602

(22) PCT Filed: Jul. 15, 2002

(86) PCT No.: PCT/DE02/02591

§ 371 (c)(1),
(2), (4) Date: Sep. 14, 2004

(87) PCT Pub. No.: WO03/028238

PCT Pub. Date: Apr. 3, 2003

(65) Prior Publication Data

US 2005/0013351 A1    Jan. 20, 2005

(30) Foreign Application Priority Data

Sep. 3, 2001    (DE) ................ 101 43 154

(51) Int. Cl.
*H04B 1/707* (2006.01)
(52) U.S. Cl. .................................. 375/150
(58) Field of Classification Search ........... 375/130, 375/134, 137, 140, 142, 145, 147, 149, 150, 375/316, 343, 355; 370/441
See application file for complete search history.

(56) References Cited

U.S. PATENT DOCUMENTS 5,602,832 A * 2/1997 Hudson ............... 370/342
5,640,416 A 6/1997 Chalmers
6,549,559 B2 * 4/2003 Kamgar et al. ......... 375/134
6,891,886 B2 * 5/2005 Doetsch et al. ......... 375/150
2002/0037028 A1 * 3/2002 Baltersee et al. ........ 375/148
2003/0156603 A1 * 8/2003 Rakib et al. ............ 370/485

FOREIGN PATENT DOCUMENTS

| DE | 198 39 018 A1 | 3/2000 |
| DE | 199 53 350 A1 | 5/2001 |
| GB | 2 282 300 A | 3/1995 |
| WO | WO 99/34528 | 7/1999 |

OTHER PUBLICATIONS

"Blind Multiuser identification and Detection in CDMA Systems", Javier R. Fonollosa, Jose A.R. Fonollosa, Zoran Zvonar and Josep Vidal, *Acoustics, Speech and Signal Processing*, 1995, ICASSP-95, International Conference on Detroit, MI, USA, May 12-19, 1995, New York, NY, USA, IEEE, US, May 9, 1995, pp. 1876-1879.

(Continued)

*Primary Examiner*—David C. Payne
*Assistant Examiner*—Leon Flores
(74) *Attorney, Agent, or Firm*—Eschweiler & Associates, LLC

(57) ABSTRACT

In order to determine the optimal sampling point for a series of spread-coded data, received by a radio, a correlation data series is used that is produced by convoluting the channel impulse response of the transmission channel with the spread data series, known at the receiving end. The channel impulse response is determined using a channel estimator according to a training sequence. An early-late correlator correlates the correlation data series with the received data in order to generate a correction signal for the optimal sampling point.

24 Claims, 2 Drawing Sheets

OTHER PUBLICATIONS

"Data Detection Techniquest for DS/CDMA Mobile Systems: A Review", Dimitris Koulakiotis and A. Hamid Aghvami, IEEE Personal Communications, IEEE Communications Society, US, vol. 7, No. 3, Jun. 3, 2000, pp. 24-34.

"Adaptive Maximum-Likelihood Receiver for Carrier-Modulated Data-Transmission Systems", Gottfried Ungerboeck, IEEE Transactions on Communications, IEEE Inc., New York, US, vol. COM-22, No. 5, May 1, 1974, pp. 624-636.

International Search Report, International Application No. PCT/DE02/02591, International Filing date Jul. 15, 2002, 3 pgs.

* cited by examiner

APPARATUS AND METHOD FOR FINE SYNCHRONIZATION WHEN SAMPLING SPREAD-CODED RECEIVED SIGNALS

RELATED APPLICATION

This application is a National Stage filing of International Application No. PCT/DE02/02591 filed Jul. 15, 2002, which is entitled "Apparatus and Method for Fine Synchronization When Sampling Spread-Coded Received Signals", which was not published in English, that claims priority to German Patent Application No. 101 43 154.6 filed on Sep. 3, 2001, and both are hereby incorporated by reference in their entirety.

FIELD OF THE INVENTION

The invention relates to an apparatus and a method for tracking the optimum sampling time for a series of received, spread-coded data in a radio receiver, particularly in a mobile radio receiver.

BACKGROUND OF THE INVENTION

In third-generation mobile radio systems, the basic receiver structures used are rake receivers and multiuser detectors. Both concepts allow consideration to be given to multipath propagation of the transmission channel such that as little transmitted signal power as possible remains unused.

The rake receiver involves the use of a finger structure, where each multipath path of the transmission channel is assigned a reception finger of the finger structure. In each finger, one of the multipath components is subjected to a time delay such that the shifted and weighted output signals from the various fingers can be added using the correct phase. This makes it possible to obtain a received signal which is as intensive as possible.

For the purpose of synchronization between the transmission and reception clocks, the received signal in each finger is correlated with the spreading sequence which is known at the receiver end. This is generally done using an "early/late correlator" which correlates the spreading code generated in the received, on the one hand, and the received signal in the finger on the other, for two different sampling phases. To set the optimum sampling time, the sampling time of the received signal is then altered until the correlation value ascertained at the early time and the correlation value ascertained at the late time match.

A prerequisite of this practice is a symmetrical correlation function. Since the signals in the individual fingers respectively describe just one multipath component, however, which means that the sampling time in a particular finger needs to be stipulated merely for one particular multipath component, sufficiently accurate synchronization is obtained by correlation with the spreading code generated at the receiver end.

In the case of the multiuser detector, on the other hand, the complete received signal, including the multipath components, is processed. For this received signal with multipath distortion, the sampling time needs to be stipulated as accurately as possible. Not until a later point in the signal path is channel estimation then performed so as then to equalize the multipath distorted received signal in line with the result of the channel estimation. In the case of the multiuser detector, the equalized received signal is then evaluated such that a plurality of users can be detected simultaneously. Whereas the interference in the signal components transmitted by various subscribers in the same frequency band is suppressed as an unwanted noise term in the case of the rake receiver, the multiuser detector involves evaluation of the received signals from all the subscribers together.

It has been found that, in the case of the multiuser detector, conventional early/late correlation of the received signal with a spreading sequence generated at the receiver end is not suitable for sufficiently accurate stipulation of the optimum sampling time.

SUMMARY OF THE INVENTION

It is therefore an object of the invention to provide an apparatus and also a method for tracking the optimum sampling time which allow fine synchronization when sampling received spread-coded signals.

The inventive apparatus for tracking the optimum sampling time for a series of received, spread-coded data is suitable for use in a radio receiver, particularly in a mobile radio receiver. In this case, the received data have been spread-coded up to the transmitter end using a spreading sequence which is known at the receiver end. The apparatus for tracking the optimum sampling time comprises means for channel estimation which use a training sequence known at the receiver end to ascertain the channel impulse response for the transmission channel, and also means for convoluting the channel impulse response with the spreading sequence known at the receiver end. In addition, the apparatus has means for early/late correlation which correlate the series of received, spread-coded data at an early time and at a late time with the correlation sequence obtained by convolution. In addition, the apparatus for tracking the optimum sampling time has means for generating a tracking signal which take the correlation ascertained at the early time and at the late time as a basis for generating a tracking signal for tracking the optimum sampling time.

On account of the transmission channel's multipath propagation characteristic, various signal components of the transmission signal reach the receiver on various paths and in so doing experience delays with various levels of pronouncement. By way of example, a signal component which reaches the receiver on a direct path will be delayed to less of an extent than a signal component which reaches the receiver following reflection on a mountain face. The received signal comprises superimposition of these multipath components delayed to different extents. If this distorted received signal were to be correlated with the undistorted spreading sequence, known at the receiver end, using an early/late correlator, in order to stipulate the optimum sampling time in this way, then at best an inaccurate result would be obtained. This is because the early/late correlator would compare the undistorted spreading sequence with the spread-coded received series, which is distorted by the multipath characteristic of the transmission channel, and these two signals differ greatly from one another when there is a pronounced multipath behavior. For this reason, if the phase of the spreading sequence leads the phase of the received signal, the correlation decays in a different way than if the phase of the spreading sequence lags the phase of the received data. This asymmetry in correlation properties means that the early/late correlator ascertains an incorrect sampling time for the received data.

The invention is based on the insight that the undistorted spreading sequence is unsuitable as a correlation sequence for the distorted, spread-coded received signal. Instead, the correlation sequence used in the case of the inventive solution is the series which would be obtained if the undistorted spreading sequence were transmitted via the transmission channel and, in this respect, were distorted in line with the multipath characteristic of the transmission channel. The undistorted spreading sequence therefore needs to be distorted in line with the multipath characteristic of the transmission channel.

To this end, the means for channel estimation actually perform channel estimation at an earlier time, and this involves comparing an undistorted training sequence known at the receiver end with the received, distorted training sequence. This makes it possible to ascertain the channel impulse response for the transmission channel, which is usually specified as a set of channel coefficients. By convoluting this channel impulse response with the undistorted spreading sequence known at the receiver end, a spreading sequence which is distorted in line with the multipath characteristic of the transmission channel and which is used as a correlation sequence in the inventive solution is obtained by means of computation. If the correlation sequence obtained in this manner is correlated with the received, spread-coded data, then the same decay behavior from the correlation response is obtained when the correlation sequence has a leading phase as when the correlation sequence has a lagging phase.

This symmetry in the decay behavior for positive and negative phase shifts makes the inventive correlation sequence particularly well suited to ascertaining the point of maximum correlation, and this point can then be chosen as the optimum sampling time. To this end, an early/late correlator ascertains the correlation of the inventive correlation sequence with the received signal at an early time and at a late time. If the early correlation ascertained in this manner matches the late correlation, then the optimum sampling time is placed precisely in the center between the early time and the late time. If, by contrast, the correlation ascertained at the early time is greater than the correlation ascertained at the late time, for example, then the optimum sampling time is not precisely in the center, but rather needs to be shifted toward earlier times using a tracking signal. This is done by generating a tracking signal which tracks the optimum sampling time on the basis of the correlation ascertained at the early time and the correlation ascertained at the late time.

The inventive correlation sequence obtained by correlating the channel impulse response with the spreading sequence known at the receiver end can be used to stipulate and track the optimum sampling time for spread-coded received data very accurately. The exact stipulation of the sampling time at the point of maximum correlation improves the reliability upon data reception and results in the bit error rate being lowered. Particularly when channel interference arises, transmission errors can be avoided by means of exact tracking of the sampling time.

It is advantageous if the series of received, spread-coded data is a series of baseband signal values. In the case of this embodiment of the invention, the radio frequency signal is first downconverted to a baseband signal at the carrier frequency zero, and only then is the optimum sampling time ascertained.

It is advantageous if the baseband signal values are complex baseband signal values which respectively comprise an inphase signal value and a quadrature signal value. In the mobile radio sector, the various modulation states are specified as points in a complex state space. In this case, the inphase signal is the real part of the complex baseband signal, while the quadrature signal delivers the imaginary part.

In line with one advantageous embodiment of the invention, the means for channel estimation deliver the channel impulse response for the transmission channel as a set of channel coefficients. To ascertain the individual channel coefficients, the received, distorted training sequence is correlated with the undistorted training sequence, which is known at the receiver end, using respectively different magnitudes of phase shift. Each value of the phase shift between the received signal and the training sequence delivers one of the channel coefficients $h_0, h_1, \ldots, h_L$ as a correlation result. In this case L is the "channel memory". To generate the inventive correlation sequence, the channel impulse response needs to be convoluted with the spreading sequence known at the receiver end. This is done by weighting the spreading sequence phase shifted by $i \cdot \Delta t$ using the associated channel coefficient $h_i$. For $i=0, 1, \ldots, L$, the weighted, phase-shifted spreading sequences are added so as to obtain the inventive correlation sequence. Using the set of channel coefficients $h_0, h_1 \ldots, h_L$, it is therefore a simple matter to convolute the channel impulse response with the spreading sequence which is known at the receiver end and which is required in order to ascertain the correlation sequence.

It is advantageous if the tracking signal tracks the optimum sampling time such that the correlation ascertained at the early time and the correlation ascertained at the late time match. The inventive calculated correlation sequence has the same multipath distortion as the received signal. As a result of this, a symmetrical drop in the correlation is obtained for positive and negative relative phase shifts between correlation sequence and received signal. This symmetry property means that it is possible to conclude from the match between the correlation ascertained at the early time and the correlation ascertained at the late time that the point of maximum correlation is situated precisely in the center between the early time and the late time. The match between the early correlation and the late correlation is thus a criterion for the optimum sampling time being set; it is then not necessary to track the sampling time further. If, on the other hand, the early correlation and the late correlation differ from one another, then the optimum sampling time is tracked.

In line with one advantageous embodiment of the invention, the tracking signal is generated by dividing the correlation ascertained at the early time and the correlation ascertained at the late time. By dividing the two correlation values and then comparing the division result with one, it is quickly possible to ascertain whether the optimum sampling time needs to be tracked in the direction of the early time or in the direction of the late time.

In this case, it is advantageous if the optimum sampling time is shifted in a first direction if the result of the division is greater than one. If the result of the division is less than one, the optimum sampling time is shifted in the direction opposite to the first direction. The direction of the shift is thus obtained from whether the division result is greater or less than one. In this case, the optimum sampling time respectively needs to be tracked in the direction of the greater correlation value. If the early correlation is greater than the late correlation, therefore, then the optimum sampling time needs to be shifted in the direction of the early correlation. From the division result, it is also possible to deduce the magnitude of the tracking required, which means that both the level and the direction of the tracking signal can be derived from the division result. This allows exact and fast tracking of the optimum sampling time, even if the transmission conditions are subject to brief fluctuations.

In line with one alternative embodiment of the invention, the tracking signal is generated by subtracting the correlation ascertained at the early time and the correlation ascertained at the late time. In this case, it is advantageous if the optimum sampling time is shifted in a first direction if the result of the subtraction is greater than zero. If the result of the subtraction is less than zero, on the other hand, then the optimum sampling time is shifted in the direction opposite to the first direction. In the case of this embodiment, the direction in which the optimum sampling time is shifted is stipulated by the subtraction result, with the tracking needing to be made in the direction of the greater of the two correlation results. The arithmetic sign and absolute value of the subtraction result stipulate the level and direction of the tracking signal. This solution also permits exact and fast tracking of the optimum sampling time.

It is advantageous if the early time is approximately half a chip period ahead of the current sampling time, and if the late time is approximately half a chip period behind the current sampling time. A spreading sequence comprises a series of chips which can assume the values −1 or 1. The interval of time between two consecutively transmitted chips is called the chip period $T_c$.

It has been found that the correlation ascertained at an early time which is approximately half a chip period ahead of the current sampling time is already significantly reduced as compared with the maximum correlation, but that such stipulation of the early time accurately allows a significant correlation to be measured. The same applies to the correlation ascertained at the late time when the late time is approximately half a chip period behind the current sampling time. In this case too, the result is a correlation which is situated between zero and the maximum correlation value and which is well suited to ascertaining the early/late correlation.

It is advantageous if the sampling time at which the received spread-coded data are sampled is a movable sampling time which is tracked in line with the tracking signal in order to set optimum sampling conditions. The received data are respectively read out at a particular sampling time and are then supplied to the inventive apparatus for tracking the optimum sampling time, which generates a tracking signal for the optimum sampling time. In line with this tracking signal, the actual sampling time is shifted such that the new sampling time obtained is the optimum sampling time. To this end, the tracking signal is supplied to the unit for sampling the received data, where it brings about a corresponding shift in the actual sampling time. The advantage of this embodiment is that it can easily be implemented with only little circuit complexity.

As an alternative to this, it is advantageous if the apparatus for tracking the optimum sampling time has a unit for linearly interpolating the received, spread-coded data which uses linear interpolation between consecutive data values in the series to generate a new series of data values sampled at the tracked optimum sampling time. In the case of this embodiment of the invention, the received data are always sampled at the same sampling time; the sampling time is thus not movable. However, since this sampling time normally does not yet correspond to the optimum sampling time, a unit for linearly interpolating the received data is provided which performs interpolation between consecutive sample values and in this way generates a new series of sampled data values by means of computation. In this case, the serial values in the new series are calculated as if the serial values had been sampled at the tracked optimum sampling time. This computational shift in the sampling time using linear interpolation between consecutive data values means that it is not necessary to shift the actual sampling time. The received, spread-coded data can therefore continue to be sampled at the same sampling time, even if this fixed sampling time generally does not coincide with the tracked optimum sampling time. The optimum sampling time is then tracked by means of computation using linear interpolation. The fact that the actual sampling time does not need to be in the form of a movable sampling time results in a more stable and more robust solution.

In this case, it is advantageous if the unit for linearly interpolating the received spread-coded data generates the new series of data values sampled at the tracked optimum sampling time in line with the tracking signal, with the tracking signal stipulating the weightings which are used for linearly combining the received, spread-coded data to form the data values in the new series. If the tracking signal is intended to shift the optimum sampling time by means of computation, then this requires alteration of the weightings which are used for linearly combining the sampled data values to form the data values in the new series.

Purely computational ascertainment of the new series of data values sampled at the tracked optimum sampling time allows fast tracking of the optimum sampling time, because the tracking signal can be converted very quickly into a corresponding change in the interpolation specification for generating the new data values. This allows fast and accurate tracking of the optimum sampling time without the need to alter the sampling of the received signal in terms of hardware.

It is advantageous if the inventive apparatus for tracking the optimum sampling time for a series of received, spread-coded data is used in a multiuser detector. In a multiuser detector, the received signal distorted by the multipath transmission characteristic is sampled and evaluated. The optimum sampling time is tracked using an early/late correlator which correlates the received signal at an early time and at a late time with a suitable correlation sequence. To be able to set the optimum sampling time with sufficient accuracy, it is necessary to choose a correlation sequence which likewise has the multipath distortion brought about by the transmission channel. Such a correlation sequence can be generated by convoluting the channel impulse response with the spreading sequence known at the receiver end. This allows fine synchronization of the optimum sampling time in a multiuser detector.

The inventive apparatus for tracking the optimum sampling time is suitable for use in a mobile radio station, and particularly for use in a mobile radio station in which the standard used for the data transmission is the UMTS standard. UMTS is the standard for CDMA transmission (CDMA: Code Division Multiple Access). In the case of this standard, the various logical transmission channels are coded using various spreading sequences in order to be able to distinguish and evaluate them in a receiver.

In the case of the inventive method for tracking the optimum sampling time for a series of received, spread-coded data in a (mobile) radio receiver, where the received data have been spread-coded at the transmitter end using a spreading sequence which is known at the receiver end, a first step involves channel estimation being performed in order to ascertain the channel impulse response for the transmission channel. This channel estimation is performed using a training sequence which is known at the receiver end. To generate a correlation sequence, the ascertained channel impulse response is subsequently convoluted with the spreading sequence which is known at the receiver end. The series of received data is correlated with the generated correlation sequence at an early time and at a late time, and subsequently a tracking signal for tracking the optimum sampling time is generated on the basis of the correlation ascertained at the early time and the correlation ascertained at the late time.

Instead of correlating the received signal with the undistorted spreading sequence, as previously in the prior art, the inventive method involves generating a correlation sequence distorted in line with the transmission characteristic of the mobile radio channel by convoluting the undistorted spreading sequence known at the receiver end with the channel impulse response ascertained by channel estimation. When correlating the correlation sequence generated in this manner with the received data, a symmetrical correlation drop is obtained for correlation sequences which lead and lag the received data. When an early/late correlator is used, this property allows exact stipulation of the optimum sampling time, which is placed exactly in the center between the early time and the late time. The early time, the optimum sampling time and the late time are tracked such that the correlation ascertained at the early time matches the correlation ascertained at the late time. The optimum sampling time has then been found.

BRIEF DESCRIPTION OF THE DRAWINGS

The invention is described in more detail below using an exemplary embodiment which is illustrated in the drawing, in which.

DETAILED DESCRIPTION OF THE INVENTION

Figure 1:
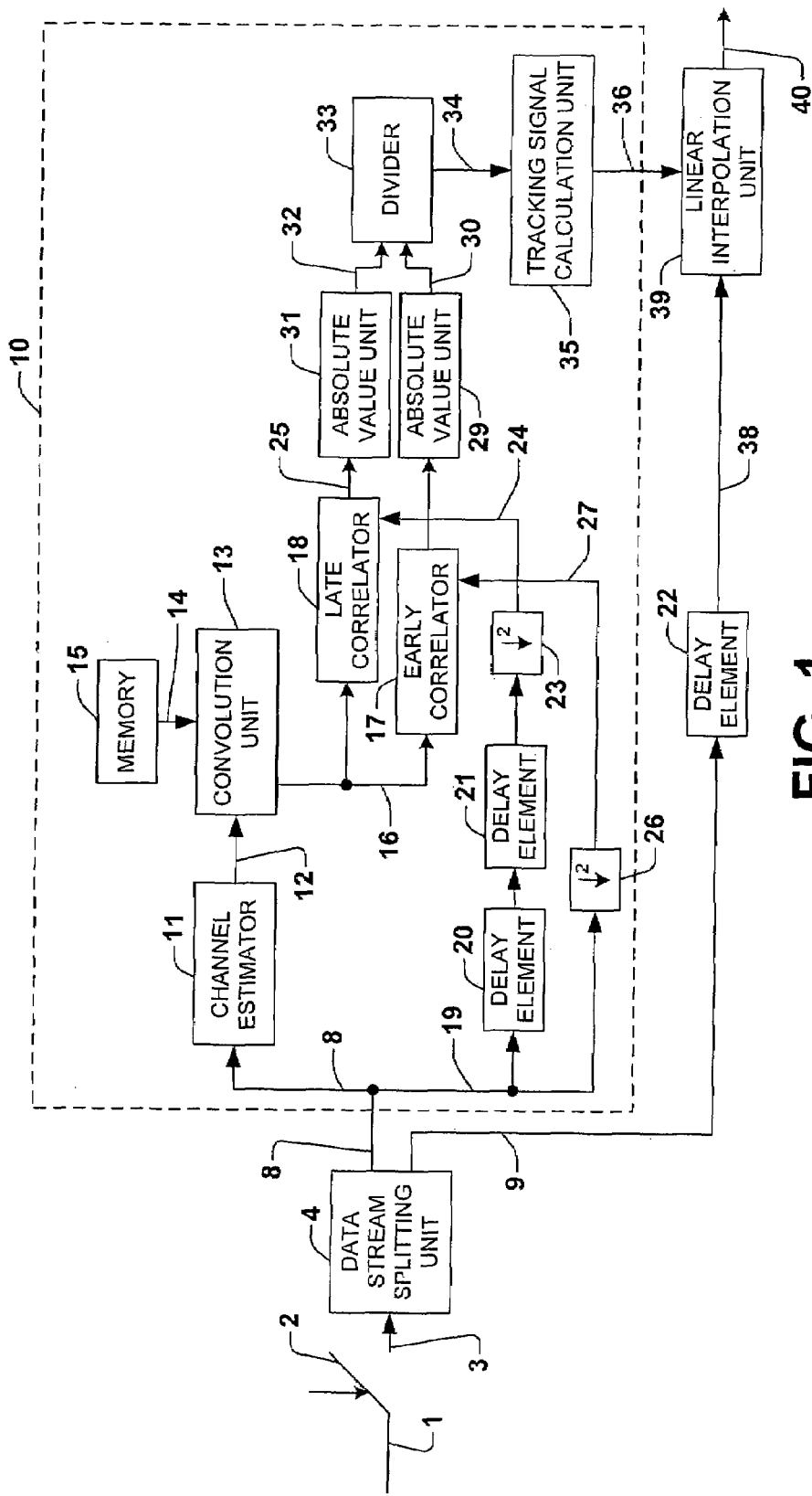
FIG. 1 shows a block diagram of the inventive synchronization unit for stipulating the optimum sampling time.

FIG. 1 shows the block diagram of the inventive apparatus for tracking the optimum sampling time for a received signal in a radio receiver, and particularly in a mobile radio receiver. The various logical transmission channels are distinguished and identified using spreading sequences which are used to spread-code the transmitted data at the transmitter end. Each spreading code comprises a succession of chips, which have either the value −1 or the value +1. The interval of time between two consecutively transmitted chips is called the chip period $T_c$.

In the receiver, the radio frequency received signal is first downconverted to the baseband. In this way, the spread-coded baseband signal 1 is obtained, which is supplied to the unit 2 for sampling the received data. The unit 2 for sampling the received data performs double oversampling on the spread-coded baseband signal 1; the result of this is that the interval of time between consecutive sampling pulses is $$\frac{T_C}{2}.$$

The double-oversampled data stream 3 obtained in this manner is supplied to the unit 4 for data stream splitting.

Figure 2:
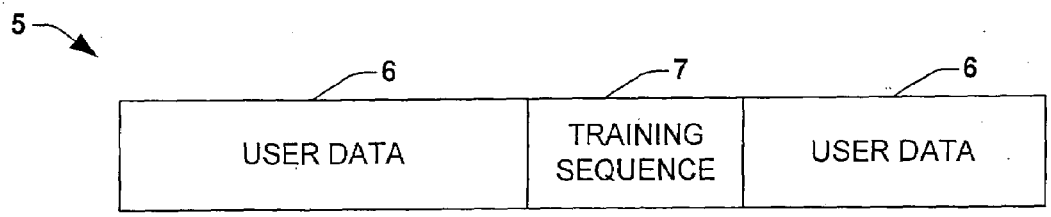
FIG. 2 shows the structure of a data burst which comprises a training sequence.

As can be seen from FIG. 2, a data burst 5 also comprises, besides the actual user data 6, a training sequence 7 which is known at the receiver end and which allows the transmission characteristic of the channel to be assessed. The unit 4 for data stream splitting splits the double-oversampled data stream 3 into the double-oversampled training sequence 8 and the double-oversampled user data stream 9. The two data streams are supplied to the unit 10 for tracking the optimum sampling time.

The channel estimator 11 has both the undistorted training sequence and the double-oversampled training sequence 8 available. The double-oversampled training sequence 8 has been distorted in line with the transmission channel's multipath characteristic. The channel estimator 11 correlates the distorted training sequence 8 repeatedly with the known undistorted training sequence, in which case the relative phase between the distorted and undistorted training sequences is varied. The various correlation results together produce the channel impulse response 12, which is usually provided as a set of channel coefficients $h_0$, $h_1$, ..., $h_L$. The channel coefficients $h_0$, $h_1$, ..., $h_L$ describe the multipath transmission behavior of the channel, where $h_0$ indicates the proportion of the multipath component delayed least, and where $h_L$ indicates the proportion of the multipath component delayed most. The channel estimator 11 provides the convolution unit 13 with the channel impulse response 12. The undistorted spreading sequence 14 known at the receiver end is read out of the memory 15 for the spreading code by the convolution unit 13. The convolution unit 13 convolutes the channel impulse response 12 with the undistorted spreading sequence 14 and in this way generates the correlation sequence 16, which is supplied to the early correlator 17 and to the late correlator 18.

To generate the late signal, the data stream 19 is delayed by the two delay elements 20 and 21, with each delay element bringing about a delay by $$\frac{T_C}{2}.$$

Altogether, the data stream 19 is therefore delayed by a chip period $T_c$ by the two delay elements 20 and 21. Since the actual user signal, the double-oversampled user data stream 9, is delayed by half a chip period by the delay element 22, the late signal lags the actual user signal by $$\frac{T_C}{2}.$$

In the unit 23 for reducing the sampling rate, the sampling rate of the late signal is halved. The data series 24 which can be tapped off at the output of the unit 23 for reducing the sampling rate, and which is delayed by $$\frac{T_C}{2},$$

is supplied to the late correlator 18, which calculates the correlation between the data series 24 delayed by $$\frac{T_C}{2}$$

and the correlation sequence 16. This correlation ascertained for the late time is output as correlation signal 25.

To generate the early signal, the sampling rate of the data stream 19 is halved by the unit 26 for reducing the sampling rate. The early signal does not pass through any delay elements. Since the user data stream 9 is delayed by $$\frac{T_C}{2}$$

by the delay element 22, an early signal which leads the user data stream by $$\frac{T_C}{2}$$

is obtained. At the output of the unit 26 for reducing the sampling rate, it is possible to tap off the data series 27 which is $$\frac{T_C}{2}$$

early, and this is correlated with the correlation sequence 16 in the early correlator 17. This gives the correlation at the early time, which is supplied as correlation signal 28 to the unit 29 for determining the absolute value of the early correlation, which determines the absolute value 30 of the early correlation. Accordingly, the unit 31 for determining the absolute value of the late correlation takes the correlation signal 25 as a basis for ascertaining the absolute value 32 of the late correlation.

In a divider 33, the absolute value of the late correlation is divided by the absolute value of the early correlation. The division result 34, which can be greater than one, equal to one or less than one, is converted into a tracking signal 36 for the sampling time by the unit 35 for calculating the tracking signal.

Figure 3:
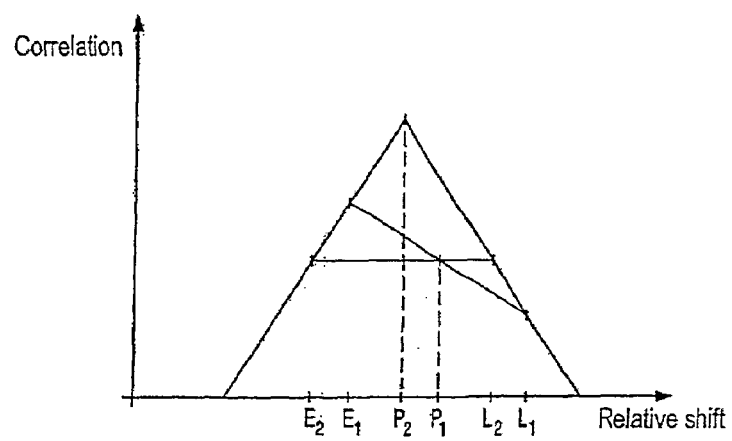
FIG. 3 shows a diagram revealing how the early/late correlator generates the tracking signal in order to track the optimum sampling time.

If the absolute value of the late correlation is smaller than the absolute value of the early correlation, then the divider 33 delivers a division result which is less than one. This case is shown in FIG. 3. FIG. 3 shows the correlation as a function of the relative shift between the received signal and the correlation sequence. At first, the absolute value of the early correlation, which is ascertained at the early time $E_1$, is higher than the absolute value of the late correlation, which is ascertained at the late time $L_1$.

From FIG. 3, it can be seen that the sampling at the sampling time $P_1$, which is situated precisely in the center between the early time $E_1$ and the late time $L_1$, takes place too late in each case. With a division result less than one, it is therefore necessary to choose the tracking signal 36 such that the sampling time is shifted toward an earlier time. The optimum sampling time $P_2$, which is always exactly in the center between the associated early time $E_2$ and the associated late time $L_2$, has been reached when the correlation value ascertained at the early time $E_2$ and the correlation value ascertained at the late time $L_2$ match. The sampling at time $P_2$ then respectively takes place precisely at the time at which the correlation between the received signal and the correlation sequence is at a maximum. When this optimum sampling time has been reached, no further tracking of the sampling time takes place.

If the absolute value of the late correlation is greater at first than the absolute value of the early correlation, than a division result which is greater than one is obtained. In this case, the tracking needs to take place in the opposite direction. The tracking signal 36 would in this case need to be chosen such that the sampling time is shifted toward a later time. In exactly the same way as in the case discussed above, tracking of the sampling time has ended when the correlation value ascertained at the early time and the correlation value ascertained at the late time match.

In the case of the embodiment shown in FIG. 1, the double-oversampled user data stream 9 passes through a delay element 22 which brings about a delay by $$\frac{T_C}{2}.$$

At the output of the delay element 22, it is possible to tap off a user data stream 38, and this user data stream 38 is applied to the input of the unit 39 for linearly interpolating the sample values. The unit 39 for linearly interpolating the sample values calculates a respective linear combination comprising two consecutive data values in the user data stream 38 and thus generates a new series of data values whose sampling time is stipulated by the interpolation specification or by the weighting of the individual data values in the user data stream 38. By altering the interpolation specification, it is possible to shift this "virtual" sampling time without this requiring alteration of the actual sampling time at which the unit 2 for sampling received data samples the baseband signal 1.

In line with the tracking signal 36, linear interpolation of the data values in the user data stream 38 is performed such that the result is a new series of received signal values sampled at the optimum sampling time. This optimally sampled received signal 40 is produced at the output of the unit 39 for linearly interpolating the sample values.

The invention claimed is:

1. An apparatus for tracking the optimum sampling time for a series of received, spread-coded data in a radio receiver, where the received data have been spread-coded at a transmitter end using a spreading sequence which is known at a receiver end, comprising:
   means for channel estimation which use a training sequence known at the receiver end to ascertain a channel impulse response for the transmission channel,
   means for convoluting the channel impulse response with the spreading sequence known at the receiver end, means for early/late correlation which correlate the training sequence data known at the receiver end at an early time and at a late time with the correlation sequence obtained by the convolution, and also, means for generating a tracking signal, which take the correlation ascertained at the early time and the correlation ascertained at the late time as a basis for generating a tracking signal for tracking an optimum sampling time.

2. The apparatus as claimed in claim 1, wherein the series of received, spread-coded data comprises a series of baseband signal values.

3. The apparatus as claimed in claim 2, wherein the baseband signal values are complex baseband signal values which respectively comprise an inphase signal value and a quadrature signal value.

4. The apparatus as claims in claim 1, wherein the means for channel estimation deliver the channel impulse response for the transmission channel as a set of channel coefficients $(h_0, h_1, \ldots h_L)$.

5. The apparatus as claimed in claim 1, wherein the tracking signal tracks the optimum sampling time such that the correlation ascertained at the early time and the correlation ascertained at the late time match.

6. The apparatus as claimed in claim 1, wherein the means for generating the tracking signal generate the tracking signal by dividing the correlation ascertained at the early time and the correlation ascertained at the late time.

7. The apparatus as claimed in claim 6, wherein the optimum sampling time is shifted in a first direction if the result of the division is greater than one, and the optimum sampling time is shifted in the direction opposite to the first direction if the result of the division is less than one.

8. The apparatus as claimed in claim 1, wherein the means for generating the tracking signal generate the tracking signal by subtracting the correlation ascertained at the early time and the correlation ascertained at the late time.

9. The apparatus as claimed in claim 8, wherein the optimum sampling time is shifted in a first direction if the result of the subtraction is greater than zero, and the optimum sampling time is shifted in the direction opposite to the first direction if the result of the subtraction is less than zero.

10. The apparatus as claimed in claim 1, wherein the early time is half a chip period $$\left(\frac{Tc}{2}\right)$$

in front of the current sampling time, and the late time is half a chip period $$\left(\frac{Tc}{2}\right)$$

behind the current sampling time.

11. The apparatus as claimed in claim 1, wherein the sampling time at which the received, spread-coded data are sampled is a movable sampling time which is tracked in line with the tracking signal in order to set optimum sampling conditions.

12. The apparatus as claimed in claim 1, wherein the apparatus for tracking the optimum sampling time comprises a unit for linearly interpolating a series of oversampled data values in the received, spread-coded data which uses linear interpolation between consecutive data values in the series of oversampled data values to generate a new series of data values sampled at the tracked optimum sampling time.

13. The apparatus as claimed in claim 12, wherein the unit for linearly interpolating the received, spread-coded data generates the new series of data values sampled at the tracked optimum sampling time in line with the tracking signal, with the tracking signal stipulating the weightings which are used for linearly combining the received spread-coded data to form the data values in the new series.

14. A multiuser detector which comprises an apparatus as claimed in claim 1.

15. A mobile radio station, which comprises an apparatus as claimed in claim 1.

16. The mobile radio station as claimed in claim 15, wherein a standard used for the data transmission is the UMTS standard.

17. A method for tracking an optimum sampling time for a series of received, spread-coded data in a radio receiver, where the received data have been spread-coded at a transmitter end using a spreading sequence which is known at a receiver end, comprising
a) performing channel estimation to ascertain a channel impulse response for the transmission channel using a training sequence known at the receiver end;
b) convoluting the channel impulse response ascertained in step a) with the spreading sequence known at the receiver end to generate a correlation sequence;
c) correlating the training sequence known at the receiver end with the correlation sequence generated in step b) at an early time and at a late time;
d) generating a tracking signal for tracking an optimum sampling time on the basis of the correlation ascertained at the early time and the correlation ascertained at the late time.

18. The method as claimed in claim 17, wherein performing the channel estimation comprises ascertaining the channel impulse response for the transmission channel as a set of channel coefficients $(h_0, h_1, \ldots h_L)$.

19. The method as claimed in claim 17, wherein generating the tracking signal for tracking the optimum sampling time comprises dividing the correlation ascertained at the early time and the correlation ascertained at the late time.

20. The method as claimed in claim 17, wherein the tracking signal for tracking the optimum sampling time comprises subtracting the correlation ascertained at the early time and the correlation ascertained at the late time.

21. The method as claimed in claim 17, wherein the early time is half a chip period $$\left(\frac{Tc}{2}\right)$$

in front of a current sampling time, and the late time is half a chip period $$\left(\frac{Tc}{2}\right)$$

behind the current sampling time.

22. The method as claimed in claim 17, further comprising shifting the sampling time at which the received spread-coded data are sampled in line with the tracking signal in order to set optimum sampling conditions.

23. The method as claimed in claim 17, further comprising linearly interpolating between consecutive data values in the series of received, spread-coded data is used to generate a new series of data values sampled at the tracked optimum sampling time.

24. The method as claimed in claim 23, wherein the linear interpolation is based on the generated tracking signal.

* * * * *